Patented Sept. 11, 1928.

1,683,831

UNITED STATES PATENT OFFICE.

LEON LILIENFELD, OF VIENNA, AUSTRIA.

CELLULOSE ETHER AND PROCESS OF MAKING SAME.

No Drawing. Application filed June 16, 1923, Serial No. 645,910, and in Austria July 13, 1922.

As is known highly etherified alkyl or aralkyl ethers of cellulose can be made from cellulose or its conversion products, either in one operation or in several stages. Cellulose may be transformed into an ether of a low stage of alkylation, and then this can be further alkylated or aralkylated.

I have now made the discovery that is possible to make technically usable cellulose ethers of a high stage of alkylation in a multistage alkylation process with small amounts of caustic alkalies and alkylating agents if celluluosic materials are used which have both a low water content (i. e. not over 50% of the weight of the cellulose, or even no water at all) and a low alkali content (i. e. not over 2 mols. of caustic alkali to 1 mol. of cellulose). These materials are treated with etherifying agents and the resulting intermediate product is then further etherified by treatment with additional quantities of caustic alkalies and etherifying agents.

For example the following method may be used: The cellulose or suitable conversion products or derivatives of cellulose are first treated with alkylating or aralkylating agents in the presence of less than 2 mols. (preferably less than 1.5 mols.), of caustic alkali to 1 mol. of $C_6H_{10}O_5$, (for example, less than 4 parts by weight, and preferably less than 3 parts by weight, of caustic soda to each 8 parts of cellulose) the water content being less than 0.5 parts by weight to 1 part of air-dried cellulosic raw material. The resulting products contain alkyl groups and when the amount of water is not too small they are at least partially soluble in aqueous alkalies while if the water content is very small they are at least partially soluble in cold water and under certain circumstances are also soluble in glacial or strong acetic acid. In common with many others they are soluble in strong hydrochloric acid.

These products, which for convenience will be called "intermediates", are then treated with further amounts of caustic alkalies and etherifying agents, either with or without previous isolation from the reaction mixture, and are thereby transformed into higher ethers of cellulose which are soluble in a sufficient number of organic solvents to be commercially useful products.

The technical advance marked by the present process lies in the fact that although the consumption of caustic alkalies and etherifying agents is reduced almost to the amount theoretically required for the stoichiometric equation, it is possible to produce cellulose ethers of a high degree of etherification which are soluble in a large number of organic solvents and whose solutions leave water-resistant, clear and flexible products, (for instance films, plastics, insulating compositions, and coatings of all kinds).

By the proper choice of conditions and proportions it is also possible to produce cellulose ethers of a high degree of etherification which are soluble in organic solvents and from which products can be made which are soluble in or swell in very cold water. It is also possible to produce cellulose ethers by this process whose solutions leave hard, brittle films.

The second product, (brittle cellulose ethers), can be made by using (a) large amounts of alkali, (b) very small amounts of water, or (c) very high reaction temperatures during the further etherification of the intermediates made by this process, or two of these conditions may be present or all three of them. Brittle cellulose ethers are useful wherever a hard, brittle film is desired as in varnishes or lacquers.

The following raw materials may be used: Cellulose of all kinds, materials containing cellulose, suitable conversion products of cellulose much as for instance a cellulose hydrate which is not too much depolymerized, (as for example artificial silk refuse, a cellulose hydrate made by precipitating viscose by heat or acids and then washing and drying, or a similar precipitate from cuprammonium cellulose), or a suitable cellulose derivative, (as for instance a precipitate from viscose with alcohols, salts or gentle heating which is then washed and dried). In the following description "cellulosic material" is intended to cover not only cellulose itself but the above mentioned conversion products and derivatives. The material is treated with caustic alkalies or alkali solution to produce a product containing less than 2 mols. (preferably less than 1.5) of alkali to 1 mol. $C_6H_{10}O_5$ and less than 0.5 parts of water to 1 part air-dried cellulose.

This product will be called "low-alkali cellulose" or "low-soda-cellulose" from now on, since it does not correspond to the substance usually called "alkali cellulose". This product can be made in various ways of which a few examples will now be given.

1. Cellulose which has been comminuted and dried in the air, or by vacuum or heat is impregnated with an alkali solution or a mixture of solid caustic alkali and alkali solution. In this case the quantities of alkali solution or solid caustic alkali and alkali solution must be calculated so that the final product of the mixture or impregnation contains less than 2 mols. (preferably less than 1.5) mols. of caustic alkali to 1 mol. of $C_6H_{10}O_5$ and less than .5 parts of water to 1 part cellulose.

The mixing or impregnation of the cellulose with alkali solution or mixed solid caustic alkali and alkali solution is preferably carried out in a powerful mixing apparatus, (for instance a kneading machine, disintegrator, masticator, edge runner, mill or the like).

2. Cellulose is kneaded with less than 2 (preferably less than 1.5) mols. of solid caustic alkali to 1 mol. $C_6H_{10}O_5$ and either no water at all is added or less than 0.5 parts to 1 part of air-dried cellulose. The water may be added during the mixture in one or more portions or air may be allowed access and the mixture permitted to absorb the desired amount of moisture. In this case also the mixing should be carried out in powerful mixing machines.

3. Cellulose is mixed or impregnated with less than 0.5 parts of water to 1 of air-dried cellulose and the moist cellulose is then mixed or kneaded with less than 2, (preferably less than 1.5) mols. of caustic alkali to 1 mol. of $C_6H_{10}O_5$.

In this case care must be taken to keep moist air out during the mixing which should take place in tightly closed mixers.

4. Cellulose is impregnated with a solution of caustic alkali of the proper concentration, (say 10 to 30%) an excess being used. The cellulose which is now impregnated with alkali solution may be allowed to stand or may be immediately pressed, centrifuged or filtered under suction or the like to remove the excess alkali solution and leave less than 2, (preferably less than 1.5) mols. of caustic alkali to 1 mol. $C_6H_{10}O_5$ in the residue, the water content being below 0.5 parts of water to 1 part of air-dried cellulose.

Since the present process works with "small amounts" of water and caustic alkali solution (namely the amounts above stated) the excess of solution must be removed in machines having a powerful action, for instance hydraulic presses.

5. Cellulose is mixed or impregnated with a caustic alkali solution having less than 2, (preferably less than 1.5) mols. of caustic alkali to 1 mol. $C_6H_{10}O_5$ and then dried, after storage if desired, until the water has been entirely removed, or until the content is less than 0.5 parts of water to 1 part of air-dried cellulose.

6. Cellulose is mixed or impregnated with an excess of caustic alkali solution preferably of about 10 to 30% strength, and the excess removed, if desired after storing, by pressing, centrifuging, suction filtration, etc., until the residue has an alkali content of less than 2, (and preferably less than 1.5), mols. of caustic alkali to 1 mol. of $C_6H_{10}O_5$. The water is then driven off until no water remains or the amount is less than 0.5 parts of water to 1 part of air-dried cellulose.

As to the amounts of caustic alkali which the alkali cellulose may finally contain in order to produce an intermediate which may be used for final alkylation the following remarks may be made:

1. That in general an amount of alkali which is less than 1 mol. to 1 mol. of $C_6H_{10}O_5$ (less than 40 to 162 by weight calculated on caustic soda) will be found sufficient.

2. That it is possible under certain circumstances to get an intermediate which is useful for final etherification by using less than a quarter of a mol. of caustic alkali to 1 mol. $C_6H_{10}O_5$ (less than 10 to 162 by weight calculated on caustic soda).

The water content of the alkali celluloses intended for use in making intermediates depends partly on the alkali content and partly on the degree of etherification desired. In general the lower the amount of water in the alkali cellulose the better the utilization of the amounts of etherifying agents used, that is the higher the degree of etherification of the intermediate and hence the less the amount of etherifying agents required to transform the intermediate into a product of a higher degree of etherification. The various degrees of etherification of the intermediates are readily shown by their solubility. The higher the degree of etherification the greater the solubility in water and even in organic solvents such as glacial acetic acid.

The following examples will bring out the differences;

1. When a low-soda cellulose containing 25 parts of caustic soda and 0 to 5 parts of water to 90 to 100 parts of anhydrous sulfite cellulose is heated with 40 parts of ethyl chloride for 12 hours at 100 to 130° C., a product results which is soluble in strong hydrochloric acid, partially soluble in a 5 to 10% sodium hydroxide solution, and in addition partially soluble in water and glacial or strong acetic acid, whereas a low soda cellulose containing the same amount of caustic soda and treated in the same manner but which contains 20 to 25 parts of water to 90 to 100 parts of anhydrous sulfite cellulose gives (under like treatment with ethyl chlorid) an intermediate which is soluble in strong hydrochloric acid, soluble for the most part in 5 to 10% sodium hydroxide solution, insoluble or only slightly soluble in water and insoluble or very slightly soluble in glacial or strong acetic acid.

2. A low-soda cellulose containing 18 parts of sodium hydroxid and 2 to 5 parts of water to 90 to 100 parts of anhydrous sulfite cellulose when heated with 28 parts of ethyl chloride for 12 hours at 100 to 130° C., gives an intermediate which is soluble in strong hydrochloric acid, at least partially soluble in 5 to 10% sodium hydroxide solution and in addition at least partially soluble in water, glacial and strong acetic acid whereas a soda cellulose of the same alkali and cellulose content but containing 45 parts of water, under the same treatment yields an intermediate which is soluble in strong hydrochloric acid and in 5 to 10% sodium hydroxide solution but which is insoluble in water, and glacial acetic or at least only traces of which dissolve.

3. A low-alkali cellulose containing 12½ parts of caustic soda to 90 to 100 parts of dry sulfite cellulose and 0 to 5 parts of water on heating with 20 parts of ethyl chloride for 12 hours at 100 to 130° C., gives an intermediate which is soluble in strong hydrochloric acid, at least partially soluble in water and glacial or strong acetic acid while a soda cellulose of the same cellulose and caustic soda content but having 12½ to 37 parts of water when treated in the same way, yields a product the greater part of which dissolves in strong hydrochloric acid or sodium hydroxide solution but which is insoluble in water and in glacial acetic acid or at most only dissolves to a very slight extent.

4. A low-alkali cellulose having 7.5 to 9 parts of caustic soda and 0 to 5 parts of water to 90 to 100 parts of dry sulfite cellulose, on heating with 12 to 15 parts of ethyl chloride for 12 hours at 100 to 130° C. gives an intermediate wholly or partially soluble in 10% sodium hydroxide solution and in strong hydrochloric acid and partially soluble in cold water, whereas the product made by treating soda cellulose of the same cellulose and alkali content but containing 30 to 45 parts of water with the same amount of ethyl chloride under the same conditions yields a product only partially soluble in 10% sodium hydroxide solution or in strong hydrochloric acid and entirely insoluble in water and glacial or strong acetic acid or at most only very slightly soluble in these liquids.

It is clear that intermediates showing more or less solubility in cold water or even glacial acetic acid are alkylated to a higher degree than those which are insoluble in cold water or only very slightly soluble. Accordingly the former will require less caustic alkali and less alkylating agents for transformation into higher etherification products than the latter.

The transformation of the low-alkali celluloses into intermediates consists in treating them with alkylating or aralkylating agents.

All reagents capable of forming ethers with alcohols or alkali metal alcoholates may be used as alkylating or aralkylating agents but the alkyl and aralkyl esters of inorganic acids are particularly well adapted. The process may be carried out in open vessels, with or without reflux condensers, (for instance when working with dialkyl sulfates, benzyl chloride, ethyl iodide and the like), or in autoclaves, or similar pressure vessels, (for instance when working with ethyl chloride, methyl chloride, ethyl bromide, etc.), the apparatus used depending on the boiling point of the etherifying agent. The quantity of alkylating agent may correspond to the amount of alkali present or it may be less or greater. In case an excess is used care must be taken not to let the reaction temperature rise too high.

In general the times and temperatures of the reaction depend on the alkylating or aralkylating agent used. For example ethyl chloride requires 4 to 24 hours and temperatures from 90 to 150° C., whereas the use of dialkyl sulfates permit the use of lower temperatures, (40 to 80° C.), and shorter times, (1 to 5 hours).

Any excess of alkylating or aralkylating agents or volatile by-products, (for instance alcohol and ether), may be removed and recovered by distillation either during the reaction or after it is finished.

After the intermediate is formed the whole reaction mixture may be treated with etherifying agents, or the intermediate may be first separated and then further etherified. The method of separation depends on the properties of the intermediate, such as solubility. Since in general the intermediates are insoluble in hot water or only slightly soluble, if it is desired to separate the intermediate, (which by the way is quite unnecessary), the mixture may be washed with hot water and dried. If the intermediates made by the present process (or the reaction mixture containing them) are to be used to prepare ethyl ethers of cellulose for example, ethers of different degrees of etherification may be produced by using different amounts of caustic alkalies and alkylating agents, for instance ethers of a low degree of alkylation can be made which are soluble in cold water or swell in it or highly alkylated ethers can be made which are insoluble in water and do not swell. If highly alkylated or aralkylated cellulose ethers are desired enough caustic alkalies and alkylating or aralkylating agents are added to the intermediates right at the start in order to cause a far-reaching alkylation or aralkylation of the cellulose molecule and the mixture is warmed up. The caustic alkalies can be added to the intermediates or the reaction mixtures containing them, in the form of solid caustic alkalies, preferably in powdered form, or as strong solutions or as mixtures of strong solutions and solid caustic alkalies.

It is also possible to prepare higher alkylated or aralkylated cellulose in two or more stages. In this case only enough caustic alkali and alkylating agents are added to the intermediate to give a comparatively low degree of alkylation (which is however higher than that of the intermediate). The resulting reaction mixtures containing lower alkylation products are then further treated with more caustic alkali and alkylating or aralkylating agents and the mixture is warmed.

Cellulose has been etherified in the past in the presence of very small quantities of water but the etherification has always been practiced on alkali celluloses of high alkali content. Such alkali celluloses when heated with alkylating or aralkylating agents yield cellulose ethers whose solutions give more or less brittle products. On the contrary the present process deals not only with alkali celluloses of low water content but also low alkali content. These alkali celluloses on treatment with etherifying agents yield first an intermediate which then can be transformed into ethers of a high degree of etherification in one or more operations.

The technical advance marked by the present process over the first mentioned process consists not only in a considerable saving in the amounts of caustic alkalies and etherifying agents used, but also results in cellulose ethers which give flexible and water-resistant products.

Cellulose ethers of a high degree of etherification have also been prepared from ethers of a lower degree of etherification in the absence of water or in the presence of small amounts of water. This process has always been carried out by using lower cellulose ethers which were made in the presence of large amounts of water or of alkali (or both) whereas on the contrary the intermediate produced by the present process is made in the absence of water or in the presence of very small quantities of water and by the use of small amounts of alkali. As a result less caustic alkali and etherifying agent is required for the thorough etherification of the cellulose molecule and yet the highly etherified products produced yield clear, water-resistant films.

Finally cellulose has been transformed into intermediates containing alkyl groups and soluble in aqueous alkalies and these intermediates have been further etherified. Alkali-soluble alkyl celluloses containing alkyl groups have been made in the past only by treating cellulose with alkylating agents in the presence of very great quantities of water or considerable quantities of alkali, (see U. S. application No. 545,365 and No. 545,364). Aside from the quantitative relations, the present process presents several advantages over the process above set forth. One advantage is that it is possible to make intermediates which are of a higher degree of etherification, with the same or even less amount of alkylating agents. Whereas for instance in the third example of the application No. 545,364, 27 to 45 parts of caustic soda and 12½ to 45 parts of ethyl chloride are used with 100 parts of cellulose the resulting product being soluble in aqueous alkalies and insoluble in glacial acetic acid that is to say quite a low alkylated product, Example VIII of the present application uses only 25 parts of caustic soda and 30 to 50 parts of ethyl chloride and gives an intermediate which dissolves in glacial acetic acid with a very slight residue and which yields fairly transparent and very flexible films from its solution. This surprising result shows how far the alkylation can be carried with small amounts of caustic soda and alkylating agents when celluloses of low water and low alkali content are used in accordance with the present process. The result is that the alkylating agents are much more fully utilized that is to say there is a considerable saving in the amounts of etherifying agents needed for making cellulose ethers of a higher degree of etherification.

A further advantage of the present process lies in the fact that alkali solutions of the intermediates made by this process which belong to the class of alkali-soluble but water-insoluble intermediates, can be treated with acids or other precipitants known in the viscose art and give films or threads which are much firmer than those made from intermediates produced according to the process of the older applications above cited. In the following examples, the parts are by weight.

*Example I.*

100 parts of preferably dried sulfite cellulose are mixed with 50 parts of a 50% sodium hydroxide solution in a mixing or kneading apparatus. (such as for instance a disintegrator, kneading machine, mill, edge runner or the like), until the mass has become homogeneous. The process is preferably carried out with cooling. The mixing time varies from 3 to 24 hours depending on the effectiveness of the mixing apparatus and the machine should preferably be kept closed from the outside air, during the mixing. The resulting product is a fine, flocculent mass, having a water content of 16 to 22% (as shown by drying at 100 to 105° C.), the amount depending on the water content of the cellulose initially used.

The mass may be allowed to stand for several days in a room which is not too warm (e. g. not over 5 to 20° C.) or it can be used immediately. The material is placed in an autoclave and 30 to 50 parts of ethyl chloride are added, the autoclave is closed and heated for 6 to 20 hours at 90 to 120° C. It is advisable to stir the material during the reaction or to keep the autoclave in motion.

The final product of the reaction which contains the intermediate is a flocculent mass with an alkaline reaction. A test sample is washed with hot water and the test shows the following solubilities:

86 to 90% in 8% sodium hydroxide solution,
0.4 to 0.5% in glacial acetic acid,
1 to 2% in 60% acetic acid and
99.2% to 100% in concentrated hydrochloric acid.

The solution of the washed product, or washed reaction mixture containing the intermediate, in dilute sodium hydroxide solution, for example 10%, is quite viscous and when precipitated with acid or other viscose precipitants (if necessary after filtering or straining), it yields a continuous film which after being washed and dried is shown to be flexible.

The separation and purification of the intermediate can proceed as follows: The reaction mixture is washed with hot water, treated with dilute acid if necessary, again washed with water and dried, or the crude reaction mass can be washed with hot water if desired or dissolved directly in dilute sodium hydroxide solution, (for instance 10%), filtered or strained if necessary and the filtrate neutralized or acidified, whereupon the intermediate precipitates and can be collected on a filter, washed and dried. The purified product dissolves to a clear solution and will keep indefinitely.

If the pure intermediate is not desired for coatings, artificial silk, films, or plastics, and if the intermediate is to be transformed into cellulose ethers of a higher degree of etherification the intermediate or the crude reaction mixture is mixed with 60 to 100 parts of solid caustic soda, (or an equivalent amount of strong sodium or potassium hydroxide solution or a mixture of strong sodium hydroxide solution and solid caustic soda), the mixing being preferably carried out with stirring, kneading or other mixing means and it is likewise advisable to provide cooling. The mass absorbs more or less water from the air depending on the moisture content of the air and the time of mixing, (for example 10 to 120 parts). The mass is then placed in an autoclave having stirring or rotating means and 100 to 160 parts of ethyl chloride is added. The autoclave is then heated for 6 to 24 hours at a temperature of 90 to 150° C. preferably with stirring or rotation of the autoclave.

The resulting product feels more or less dry and after acidifying to remove by-products if required, it is washed with water, or with water then with an acid and then again with water and dried.

The dried ethyl cellulose is soluble in volatile solvents, (for instance alcohol, benzol, alcohol-benzol mixture, glacial acetic acid, chloroform, chloroform-alcohol mixture, methyl-acetate-methyl-alcohol mixture, etc.). When spread in thin layers and dried these solutions yield a flexible film.

*Example II.*

Process the same as in Example I with the difference that only 25 parts of a 50% sodium hydroxide solution are used with 100 parts of dry sulfite cellulose to make the alkali cellulose and 15 to 30 parts of ethyl chloride are used in making the intermediate. The reaction times and temperatures are the same as in Example I. The resulting intermediate is washed in hot water and dried and shows the following solubilities;

56 to 75% in strong hydrochloric acid.
46 to 84% in 8% sodium hydroxide solution and
0% in glacial acetic acid.

A solution of the intermediate in dilute sodium hydroxide solution, for instance 10%, is treated as in Example I and gives a strong, very flexible film.

If it is desired to transform the intermediate into an ether of a higher degree of etherification the same procedure is followed as in Example I.

The resulting ethyl cellulose has the same properties and solubilities as that described in Example I.

*Example III.*

Process the same as in Examples I and II except that 50 parts of a 25% sodium hydroxide solution are used with 100 parts of dry sulfite cellulose in making the soda cellulose and only 15 to 25 parts of ethyl chloride are used in making the intermediate. Reaction times and temperatures being the same as in Example I.

A test sample of the intermediate after washing with hot water and drying showed the following solubilities:

87 to 90% in 8% sodium hydroxide solution,
1 to 3% in glacial acetic acid,
2 to 3% in 60% acetic acid,
70 to 80% in concentrated hydrochloric acid.

A solution of the intermediate in 10% sodium hydroxide when treated as in Example I gives a flexible film.

If the intermediate is to be transformed into an ether of a higher degree of etherification the same procedure is followed as in Example 1.

The resulting ethyl cellulose has the same properties and solubilities as that made in Example I.

Example IV.

Process the same as in Example I, 50 parts of a 15 to 18% sodium hydroxide solution are used with 100 parts of dry sulfite cellulose to make the soda cellulose and 15 to 25 parts of ethyl chloride are used to make the intermediate, under the conditions as per Example I.

A washed and dried sample of the intermediate shows the following solubilities:

40 to 60% in 8% sodium hydroxide solution, 0 to 0.5% in glacial acetic acid, entirely insoluble in 60% acetic acid.

60 to 70% in concentrated hydrochloric acid.

A solution of the intermediate in 10% sodium hydroxide treated as in Example I yields a fairly flexible film.

If the intermediate is to be transformed into an ether of a higher degree of etherification the process of Example I, is followed exactly.

The resulting ethyl cellulose has the same properties and solubilities as that made according to Example I.

Example V.

Process the same as in Example I except that 25 parts of a 25 to 50% sodium hydroxide solution mixed with 12.5 to 30 parts of solid caustic soda are used in making the soda cellulose and 40 to 70 parts of ethyl chloride in making the intermediate.

The intermediate has about the same properties as the intermediate described in Example I.

The intermediate is worked up into an ether of a higher degree of etherification in the same way as in Example I. The properties and solubilities of the final product are also the same as those of the product described in Example I.

Example VI.

100 parts of dried sulfite cellulose are impregnated with 750 to 1000 parts of a 10 to 25% sodium hydroxide solution and allowed to stand for 12 to 48 hours. The mass is then pressed down to 125 to 150 parts, (preferably in a hydraulic press), and then comminuted either by hand or in a suitable machine, (for instance a disintegrator). The comminuted mass may be stored for 2 or 3 days and is then mixed with 10 to 25 parts of ethyl chloride and kept under pressure preferably with stirring, (for instance the mixture may be heated in an autoclave having stirring or rotating means) at a temperature of 80 to 110° C. for several hours (for instance 6 to 20).

The resulting mass is flocculent and not very voluminous and is soluble in dilute sodium hydroxide, (for instance 10%), and in concentrated hydrochloric acid. It is scarcely soluble in glacial acetic acid. The alkali solutions on treatment with acids give thick, coarse precipitates. When spread out in thin layers and treated with acids or other precipitating baths known in the viscose art, the solutions yield opaque, flexible films.

The product can be separated and purified according to the method shown Example I.

The procedure for tranforming the intermediate into an ethyl ether of cellulose of a higher degree of etherification is the same as in Example I.

The finished ethyl cellulose has the same properties and solubilities as that made in Example I.

Example VII.

100 parts of dry sulfite cellulose are impregnated with 800 to 1000 parts of a 10% sodium hydroxide solution and allowed to stand for 12 to 48 hours. The mass is then pressed to 220 parts and comminuted by hand or in a suitable machine, (for instance a disintegrator). The comminuted soda cellulose may be stored for 2 or 3 days if desired and is then dried in a vacuum to 147 parts. The mass may be dried over a dehydrating substance, (for example concentrated sulfuric acid, quicklime, calcium chloride, or the like). The mass is then comminuted with cooling in a suitable machine, (for example a disintegrator, mill, edge runner, etc), placed in a rotatable autoclave together with 15 to 25 parts of ethyl chloride and heated for several hours, (6 to 20) at 80 to 120° C.

A flocculent product results which is soluble in dilute sodium hydroxide solution, (e. g. 10%) and in concentrated hydrochloric acid whereas it is scarcely soluble in glacial acetic acid.

The separating and purifying can be conducted as in Example I.

A solution of the intermediate in 10% sodium hydroxide solution when treated as in Example I gives a fairly flexible film.

If it is desired to transform the intermediate into an ethyl ether of a higher degree of etherification instead of using it by itself the further etherification can be conducted as in the case of the intermediate in Example I.

The resulting ethyl cellulose of a higher degree of etherification has about the same properties and solubilities as that in Example I.

Example VIII.

100 parts of dry sulfite cellulose are impregnated with 1,000 parts of an 18% solution of sodium hydroxide and allowed to stand for 12 to 48 hours. The mass is then pressed to 200 to 230 parts, comminuted, and after standing 1 to 3 days if necessary, is dried in a vacuum to 145 parts. It is then comminuted in a disintegrator or similar machine with cooling and then heated in a rotating autoclave with 30 to 50 parts of ethyl chloride for several hours, (say 6 to 20), at 80 to 120° C.

A sample of the product washed with hot water and dried, dissolves in glacial acetic acid and strong acetic acid with little or no residue. The glacial acetic acid solution gives a fairly transparent, flexible film on drying.

The transformation of this intermediate into an ether of a higher degree of etherification is performed the same as in Example I.

The resulting ethyl cellulose of a higher degree of etherification has the same properties and solubilities as the final product of Example I.

*Example IX.*

100 parts of preferably dry sulfite cellulose are impregnated with 800 to 1,000 parts of a 15 to 18% sodium hydroxide solution and allowed to stand for 24 to 72 hours. The mass is then pressed to 190 to 200 parts and comminuted in a suitable machine, such as a disintegrator or the like. After storing for 1 to 3 days if necessary, the mass is dried in a vacuum to constant weight. It is advisable to carry out the vacuum drying in thin layers or with stirring, for instance in a vacuum disintegrator, vacuum kneading machine or the like. If desired the vacuum drying may be over a dehydrating substance such as concentrated sulfuric acid, quicklime, calcium chloride or the like. After the drying process the mass usually weighs 115 to 140 parts depending on the water content of the raw cellulose used. The water content of the dried mass is 0 to 20%.

The dried low-soda cellulose, after comminution if necessary, is placed in a rotatable autoclave, 24 to 50 parts of ethyl chloride are added and the mixture is heated at 80 to 110° C. for several hours, (say 6 to 20). The final product is a flocculent mass which feels dry and has the following solubilities:

34 to 50% in glacial or strong acetic acid,
90 to 100% in strong hydrochloric acid,
57 to 80% in 10% sodium hydroxide solution and
20 to 40% in cold water.

In transforming this intermediate into an ether of a higher degree of etherification 60 to 100 parts of powdered caustic soda is incorporated in the reaction mixture with cooling either by hand or in effective mixing or kneading machines. If it is desired to produce an ethyl ether of a higher degree of etherification whose solutions yield very flexible films it is advisable to see to it that the low-soda cellulose absorbs a greater or less amount of water depending on the amount of caustic soda incorporated. This can be done by allowing the air to have access during the incorporation of the powdered caustic soda so that the mass can absorb the required amount of water, or the required amount of water may be added after the mixing is completed or finally the soda cellulose can be dried in a vacuum until it contains the calculated amount of water and then mixed with powdered caustic soda. The water content of the product after incorporation of the powdered caustic soda may vary widely. For example, a water content of 10 to 60 parts may correspond to a caustic soda content of 60 parts, 20 to 80 parts of water to 80 parts of caustic soda and 40 to 100 parts of water to 100 parts of caustic soda. However the present invention is not restricted to these water figures.

The mass is then again placed in an autoclave, 100 to 160 parts of ethyl chloride are added and the mixture is heated at 90 to 150° C., for several hours, (say 6 to 24) during the reaction the mass should be stirred or the autoclave kept in motion.

The finishing of the highly ethylated ethyl cellulose is conducted according to the method in Example I. The resulting product has the same properties and solubilities as the ethyl cellulose described in Example I.

*Example X.*

Process the same as in Example IX except that the soda cellulose is pressed only to 300 to 325 parts before drying and 50 to 70 parts of ethyl chloride are used to make the intermediate from the vacuum-dried soda cellulose.

The intermediate produced in these examples is soluble in glacial acetic acid and the solution leaves a flexible film on drying.

The further etherification of the intermediate according to the method of the previous example results in an ethyl cellulose of a high degree of etherification which has the same properties and solubilities as in Example I.

*Example XI.*

Process as in example IX except that a 25% sodium hydroxide solution is used in making the soda cellulose, the impregnated cellulose is pressed to 250 parts and 50 to 60 parts of ethyl chloride are used in making the intermediate. The further etherification is as in Example IX.

The properties and solubilities of the finished ethyl cellulose of a higher degree of etherification correspond approximately with those of the product of Example I.

*Example XII.*

100 parts of sulfite cellulose are impregnated with 800 to 1000 parts of an 18% sodium hydroxide solution and allowed to stand for 24 to 72 hours. The mass is then pressed to 190 to 200 parts and comminuted in a suitable machine such as a disintegrator, edge runner or the like. After standing 1 to 3 days if necessary the mass is dried in a vacuum to constant weight, preferably over a dehydrator, (such as concentrated sulfuric acid, quicklime, calcium chloride or the like). The mass is then again comminuted in a suitable machine, preferably with cooling. The mass usually weighs from 115 to 130 parts depending on the water content of the initial cellulose.

The dried low-soda cellulose is then placed in a mixing machine, kneading machine, or disintegrator and 60 to 75 parts of diethyl sulfate is kneaded in and the mass gradually heated to 45 to 60° C., and kept at this temperature until all the diethyl sulfate is used up which can readily be detected by the odor. If the heating is too sudden the reaction is quite violent and the temperature may rise above 70 to 80° C.

100 to 160 parts of powdered caustic soda is gradually incorporated into the resulting intermediate with cooling, and care is taken that the final product of this mixing absorbs 60 to 100 parts of water. The mass is then kneaded, rubbed or mixed with 385 to 616 parts of diethyl sulfate in such a way that the reaction temperature does not rise above 60° C.

The resulting ethyl cellulose is soluble in a whole series of volatile solvents such as glacial acetic acid, benzol-alcohol mixture, chloroform-methyl-alcohol mixture, methyl-acetate-methyl-alcohol mixture, etc.

If in the preceding examples the amount of alkali used in transforming the intermediate into an ether of a higher degree of etherification is increased or the amount of water materially decreased or if both are done the resulting cellulose ethers give clear films from their solutions but the films are brittle which makes them particularly adapted for certain purposes such as lacquers and varnishes.

The terms "ether", "etherifying agent", "etherification", etc., cover alkyl and aralkyl ethers, alkylating and aralkylating agents, alkylation and aralkylation.

Wherever the term "intermediate" is used in the claims it is intended to cover not only the intermediate itself after it has been separated but also the crude reaction mixtures which contain the intermediate.

I claim:

1. A process of preparing cellulose ethers which comprises treating low-alkali-content and low-water-content alkali cellulose containing per 100 parts of cellulose, not over 50 parts each of caustic alkali and water, with etherifying agents and allowing caustic alkalies and etherifying agents to act on the intermediate formed.

2. A process of preparing cellulose ethers which comprises treating low-alkali celluloses containing less than 2 mols. of caustic alkali to 1 mol. of $C_6H_{10}O_5$ and less than 0.5 parts by weight of water to 1 part of air-dry cellulose with etherifying agents, and allowing caustic alkali and etherifying agents to act upon the intermediate formed.

3. A process for preparing cellulose ethers which comprises treating low-alkali celluloses containing less than 1.5 mols. of caustic alkali to 1 mol. of $C_6H_{10}O_5$ and less than 0.5 parts by weight of water to 1 part of air-dry cellulose with etherifying agents, and allowing caustic alkali and etherifying agents to act on the intermediate formed.

4. A process of preparing cellulose ethers which comprises treating low-alkali cellulose containing less than 1 mol. of caustic alkali to 1 mol. of $C_6H_{10}O_5$ and less than 0.5 parts by weight of water to 1 part of air-dry cellulose with etherifying agents, and allowing caustic alkali and etherifying agents to act on the intermediate formed.

5. A process of preparing cellulose ethers which comprises treating low-alkali cellulose containing less than 2 mols. of caustic alkali to 1 mol. of $C_6H_{10}O_5$ and less than 0.3 parts by weight of water to 1 part of air-dry cellulose with etherifying agents, and allowing caustic alkali and etherifying agents to act on the intermediate formed.

6. A process of preparing cellulose ethers which comprises treating low-alkali cellulose containing less than 1.5 mols. of caustic alkali to 1 mol. of $C_6H_{10}O_5$ and less than 0.3 parts by weight of water to 1 part of air-dry cellulose with etherifying agents and allowing caustic alkali and etherifying agents to act on the intermediate formed.

7. A process of preparing cellulose ethers which comprises treating low-alkali cellulose containing less than 1 mol. of caustic alkali to 1 mol. of $C_6H_{10}O_5$ and less than 0.3 parts by weight of water to 1 part of air-dry cellulose with etherifying agents and allowing caustic alkali and etherifying agents to act on the intermediate formed.

8. A process of preparing cellulose ethers which comprises treating low-alkali cellulose containing less than 2 mols. of caustic alkali to 1 mol. of $C_6H_{10}O_5$ and less than 0.1 parts by weight of water to 1 part of air-dry cellulose with etherifying agents and allowing caustic alkali and etherifying agents to act on the intermediate formed.

9. A process of preparing cellulose ethers which comprises treating low-alkali cellulose containing less than 1.5 mols. of caustic alkali to 1 mol. of $C_6H_{10}O_5$ and less than 0.1 part by weight of water to 1 part of air-dry cellulose with etherifying agents, and allowing caustic alkali and etherifying agents to act on the intermediate formed.

10. A process for preparing cellulose ethers which comprises treating low-alkali cellulose containing less than 1 mol. of caustic alkali to 1 mol. of $C_6H_{10}O_5$ and less than 0.1 part by weight of water to 1 part of air-dry cellulose with etherifying agents, and allowing caustic alkalies and etherifying agents to act on the intermediate formed.

11. A process of preparing cellulose ethers which comprises treating low-alkali cellulose containing less than 2 mols. of caustic alkali to 1 mol. of $C_6H_{10}O_5$ and less than 0.02 parts of water to 1 part of air-dry cellulose with etherifying agents, and allowing caustic alkali and etherifying agents to act on the intermediate formed.

12. A process of preparing cellulose ethers which comprises treating low-alkali cellulose containing less than 1.5 mols. of caustic alkali to 1 mol. of $C_6H_{10}O_5$ and less than 0.02 parts of water to 1 part of air-dry cellulose with etherifying agents, and allowing caustic alkali and etherifying agents to act on the intermediate formed.

13. A process of preparing cellulose ethers which comprises treating low-alkali cellulose containing less than 1 mol. of caustic alkali to 1 mol. of $C_6H_{10}O_5$ and less than 0.02 parts of water to 1 part of air-dry cellulose with etherifying agents, and allowing caustic alkali and etherifying agents to act on the intermediate formed.

14. A process of preparing cellulose ethers which comprises treating cellulose with an alkali solution in such amount and concentration as to transform it into low-alkali cellulose containing not over 25% each of caustic alkali and water, treating this low-alkali cellulose with etherifying agents and finally acting on the resulting intermediate with caustic alkalies and etherifying agents.

15. A process of preparing cellulose ethers which comprises drying a low alkali cellulose which contains less than 2 mols. of caustic alkali to 1 mol. of $C_6H_{10}O_5$ and more than 0.5 parts by weight of water to 1 part of air-dry cellulose, until it contains less than 0.5 parts of water to 1 part of air-dry cellulose, treating this low-alkali cellulose with etherifying agents, and finally acting on the intermediate produced with caustic alkalies and etherifying agents.

16. A process of preparing cellulose ethers which comprises drying a low-alkali cellulose containing less than 1.5 mols. of caustic alkali to 1 mol. of $C_6H_{10}O_5$ and more than 0.5 parts by weight of water to 1 part of air-dry cellulose, until it contains less than 0.5 parts of water to 1 part of air-dry cellulose. treating this low-alkali cellulose with etherifying agents, and finally treating the resulting intermediate with caustic alkalies and etherifying agents.

17. A process of preparing cellulose ethers which comprises drying a low-alkali cellulose containing less than 1 mol. of caustic alkali to 1 mol. of $C_6H_{10}O_5$ and more than 0.5 parts by weight of water to 1 part of air-dry cellulose until it contains less than 0.5 parts of water to 1 part of air-dry cellulose, treating this low-alkali cellulose with etherifying agents, and finally acting on the resulting intermediate with caustic alkalies and etherifying agents.

18. A process of preparing cellulose ethers which comprises drying a low-alkali cellulose containing less than 2 mols. of caustic alkali to 1 mol. of $C_6H_{10}O_5$ and more than 0.3 parts by weight of water to 1 part of air-dry cellulose until it contains less than 0.3 parts of water to 1 part of air-dry cellulose, treating this low-alkali cellulose with etherifying agents and finally acting on the resulting intermediate with caustic alkalies and etherifying agents.

19. A process of preparing cellulose ethers which comprises drying a low-alkali cellulose containing less than 1.5 mols. of caustic alkali to 1 mol. of $C_6H_{10}O_5$ and more than 0.3 parts by weight of water to 1 part of air-dry cellulose until it contains less than 0.3 parts of water to 1 part of air-dry cellulose. treating this low-alkali cellulose with etherifying agents, and finally acting on the resulting intermediate with caustic alkalies and etherifying agents.

20. A process of preparing cellulose ethers which comprises drying a low-alkali cellulose containing less than 1 mol. of caustic alkali to 1 mol. of $C_6H_{10}O_5$ and more than 0.3 parts by weight of water to 1 part of air-dry cellulose until it contains less than 0.3 parts of water to 1 part of air-dry cellulose, treating this low-alkali cellulose with etherifying agents and finally acting on the resulting intermediate with caustic alkalies and etherifying agents.

21. A process of preparing cellulose ethers which comprises drying a low-alkali cellulose containing less than 2 mols. of caustic alkali to 1 mol. of $C_6H_{10}O_5$ and more than 0.1 part by weight of water to 1 part of air-dry cellulose until it contains less than 0.1 part of water to 1 part of air-dry cellulose, treating this low-alkali cellulose with etherifying agents and finally acting on the resulting intermediate with caustic alkalies and etherifying agents.

22. A process of preparing cellulose ethers which comprises drying a low-alkali cellulose containing less than 1.5 mols. of caustic alkali to 1 mol. of $C_6H_{10}O_5$ and more than 0.1 part by weight of water to 1 part of air-dry cellulose until it contains less than 0.1 part of water to 1 part of air-dry cellulose, treating this low-alkali cellulose with etherifying agents and finally acting on the resulting intermediate with caustic alkalies and etherifying agents.

23. A process of preparing cellulose ethers which comprises drying a low-alkali cellulose containing less than 1 mol. of caustic alkali to 1 mol. of $C_6H_{10}O_5$ and more than 0.1 part by weight of water to 1 part of air-dry cellulose until it contains less than 0.1 part of water to 1 part of air-dry cellulose, treating this alkali cellulose with etherifying agents and finally acting on the resulting intermediate with caustic alkalies and etherifying agents.

24. A process of preparing cellulose derivatives containing alkyl groups and soluble in aqueous alkalies which comprises treating low-alkali cellulose containing per 162 parts of cellulose, caustic alkali equivalent to not over 80 parts of NaOH, and containing not over 81 parts of water, with alkylating agents.

25. A process of preparing cellulose derivatives containing alkyl groups and soluble in aqueous alkalies which comprises treating a cellulosic material with an alkali and water, in such proportions as to produce a low-alkali cellulose having a water content below 25% and having an alkali content below 25%, computed as NaOH, and thereafter treating this low alkali cellulose with alkylating agents.

26. A process of preparing cellulose derivatives containing alkyl groups and soluble in aqueous alkalies which comprises mixing an alkali solution with such an amount of a cellulosic material as to form a low alkali cellulose containing less than 2 mols. of caustic alkali to 1 mol. of $C_6H_{10}O_5$ and less than 0.3 parts by weight of water to 1 part of air-dry cellulosic material and treating this low-alkali cellulose with alkylating agents.

27. A process of preparing cellulose derivatives containing alkyl groups and soluble in aqueous alkalies which comprises mixing an alkali solution with such an amount of a cellulosic material as to form a low alkali cellulose containing less than 1.5 mols. of caustic alkali to 1 mol. of $C_6H_{10}O_5$ and less than 0.3 parts by weight of water to 1 part of air dry-cellulosic material and thereafter treating this low-alkali cellulose with alkylating agents.

28. A process for preparing cellulose derivatives containing alkyl groups and soluble in aqueous alkalies which comprises mixing an alkali solution with enough of a cellulosic material in such proportions as to form a low alkali cellulose containing less than 1 mol. of caustic alkali to 1 mol. of $C_6H_{10}O_5$ and less than 0.3 parts by weight of water to 1 part of air-dry cellulosic material and treating this low-alkali cellulose with alkylating agents.

29. A process for preparing cellulose derivatives containing alkyl groups and soluble in aqueous alkalies which comprises mixing cellulosic material with a mixture of saturated alkali solution and solid caustic alkali in such proportions as to form a low-alkali cellulose of low water content and low alkali content and treating this low-alkali cellulose with alkylating agents.

30. A process of preparing cellulose derivatives containing alkyl groups and soluble in aqueous alkalies which comprises mixing a cellulosic material with a mixture of saturated alkali solution and solid alkali in such proportions as to form a low alkali cellulose containing less than 2 mols. of caustic alkali to 1 mol. of $C_6H_{10}O_5$ and less than 0.5 parts by weight of water to 1 part of air-dry cellulosic material and then treating this low-alkali cellulose with alkylating agents.

31. A process of preparing cellulose derivatives containing alkyl groups and soluble in aqueous alkalies which comprises mixing cellulosic material with enough of a mixture of saturated alkali solution and solid caustic alkali to form a low alkali cellulose containing less than 1.5 mols. of caustic alkali to 1 mol. of $C_6H_{10}O_5$ and less than 0.5 parts by weight of water to 1 part of air-dry cellulosic material and then treating this low-alkali cellulose with alkylating agents.

32. A process of preparing cellulose derivatives containing alkyl groups and soluble in aqueous alkalies which comprises mixing a cellulosic material with enough of a mixture of saturated alkali solution and solid caustic alkali to form a low alkali cellulose containing less than 1 mol. of caustic alkali to 1 mol. of $C_6H_{10}O_5$ and less than 0.5 parts by weight of water to 1 part of air-dry cellulosic material and then treating this low-alkali cellulose with alkylating agents.

33. A process of preparing cellulose derivatives containing alkyl groups and soluble in aqueous alkalies which comprises mixing a cellulosic material with enough of a mixture of saturated alkali solution and solid caustic alkali to form a low alkali cellulose containing less than 2 mols. of caustic alkali to 1 mol. of $C_6H_{10}O_5$ and less than 0.3 parts by weight of water to 1 part of air-dry cellulosic material and then treating this low-alkali cellulose with alkylating agents.

34. A process of preparing cellulose derivatives containing alkyl groups and soluble in aqueous alkalies which comprises mixing a cellulosic material with a mixture of saturated alkali solution and solid caustic alkali in such proportions as to form a low alkali cellulose containing less than 1.5 mols. of caustic alkali to 1 mol. of $C_6H_{10}O_5$ and less than 0.5 parts by weight of water to 1 part of air-dry cellulosic material and then treating this low-alkali cellulose with alkylating agents.

35. A process of preparing cellulose derivatives containing alkyl groups and soluble in aqueous alkalies which comprises mixing a cellulosic material with a mixture of saturated alkali solution and solid caustic alkali in such proportions as to form a low alkali cellulose containing less than 1 mol. of caustic alkali to 1 mol. of $C_6H_{10}O_5$ and less than 0.3 parts by weight of water to 1 part of air-dry cellulosic material and then treating this low-alkali cellulose with alkylating agents.

36. A process of preparing cellulose derivatives containing alkyl groups and soluble in aqueous alkalies which comprises mixing a cellulosic material with a mixture of saturated alkali solution and solid caustic alkali in such proportions as to form a low alkali cellulose containing less than 2 mols. of caustic alkali to 1 mol. of $C_6H_{10}O_5$ and less than 0.1 part by weight of water to 1 part of air-dry cellulosic material, and then treating this low-alkali cellulose with alkylating agents.

37. A process of preparing cellulose derivatives containing alkyl groups and soluble in aqueous alkalies which comprises mixing a cellulosic material with a mixture of saturated alkali solution and solid caustic alkali in such proportions as to form a low alkali cellulose containing less than 1.5 mol. of caustic alkali to 1 mol. $C_6H_{10}O_5$ and less than 0.1 part by weight of water to 1 part of air-dry cellulosic material, and then treating this low-alkali cellulose with alkylating agents.

38. A process of preparing cellulose derivatives containing alkyl groups and soluble in aqueous alkalies which comprises mixing a cellulosic material with a mixture of saturated alkali solution and solid caustic alkali in such proportions as to form a low alkali cellulose containing less than 1 mol. of caustic alkali to 1 mol. of $C_6H_{10}O_5$ and less than 0.1 part by weight of water to 1 part of air-dry cellulosic material, and then treating this low-alkali cellulose with alkylating agents.

39. In the process of preparing valuable intermediates for the etherification of cellulose the step which comprises depriving a low alkali cellulose containing less than 2 mols. of caustic alkali to 1 mol. of $C_6H_{10}O_5$ of at least a part of its water content, by drying.

40. In the process of preparing valuable intermediates for the etherfication of cellulose the step which comprises depriving a low alkali cellulose containing less than 1.5 mols. of caustic alkali to 1 mol. of $C_6H_{10}O_5$, of at least a part of its water content, by drying.

41. In a process of preparing valuable intermediates for the etherification of cellulose, the step which comprises depriving a low alkali cellulose containing less than 1 mol. of caustic alkali to 1 mol. of $C_6H_{10}O_5$, of at least a part of its water content, by drying.

42. A process which comprises incorporating a cellulosic material with caustic alkali in the proportion of not more than 2 mols. of caustic alkali to 1 mol. of $C_6H_{10}O_5$, in the absence of more water than would correspond to 0.5 parts of water to 1 part of air-dry cellulosic material, and acting upon this low-alkali cellulose with an etherifying agent.

43. A process which comprises incorporating a cellulosic material with caustic alkali in the proportion of not more than 1.5 mols. of caustic alkali to 1 mol. of $C_6H_{10}O_5$, in the absence of more water than would correspond to 0.5 parts of water to 1 part of air-dry cellulosic material, and acting upon this low-alkali cellulose with an etherifying agent.

44. A process which comprises incorporating a cellulosic material with caustic alkali in the proportion of not more than 1 mol. of caustic alkali to 1 mol. of $C_6H_{10}O_5$, in the absence of more water than would correspond to 0.5 parts of water to 1 part of air-dry cellulosic material, and acting upon this low-alkali cellulose with an etherifying agent.

In testimony whereof I affix my signature.

LEON LILIENFELD.